United States Patent [19]
Dean, II et al.
[11] Patent Number: 4,827,295
[45] Date of Patent: May 2, 1989

[54] CONDITIONING APPARATUS FOR NON-IMPACT, DIRECT CHARGE ELECTROGRAPHIC PRINTER BELT

[75] Inventors: Walter C. Dean, II, Simsbury, Conn.; Thomas D. Kegelman, Palm Harbor, Fla.

[73] Assignee: Moore Business Forms, Inc., Grand Island, N.Y.

[21] Appl. No.: 131,928

[22] Filed: Dec. 11, 1987

[51] Int. Cl.$^4$ .......... G01D 15/00
[52] U.S. Cl. .......... 346/160.1; 346/153.1
[58] Field of Search .......... 346/153.1, 155, 150, 346/160.1; 355/3 CH, 3 BE, 14 CH; 250/325

[56] References Cited

U.S. PATENT DOCUMENTS

| | | | |
|---|---|---|---|
| 4,264,912 | 4/1981 | Coburn et al. | 346/160.1 |
| 4,423,354 | 12/1983 | Kegelman | 346/160.1 |
| 4,468,681 | 8/1984 | Wako et al. | 346/153.1 |
| 4,638,339 | 1/1987 | Coburn et al. | 346/160.1 |
| 4,642,661 | 2/1987 | Dean, II | 346/160.1 |
| 4,651,605 | 3/1987 | Dean, II | 346/160.1 |

*Primary Examiner*—Arthur G. Evans
*Attorney, Agent, or Firm*—Nixon & Vanderhye

[57] ABSTRACT

A belt conditioner for non-impact electrographic printing apparatus using a flexible dielectric belt (including a conductive member forming a ground plane opposite the dielectric surface) has plural electrically conductive rollers engaging the dielectric charge receiving surface to effect controlled discharge of the surface to a uniform surface electrostatic voltage before direct charge deposition by a print head to form a latent electrostatic image. Corona discharge devices can also be utilized with the rollers to obtain the desired belt conditioning.

12 Claims, 5 Drawing Sheets

FIG. 2
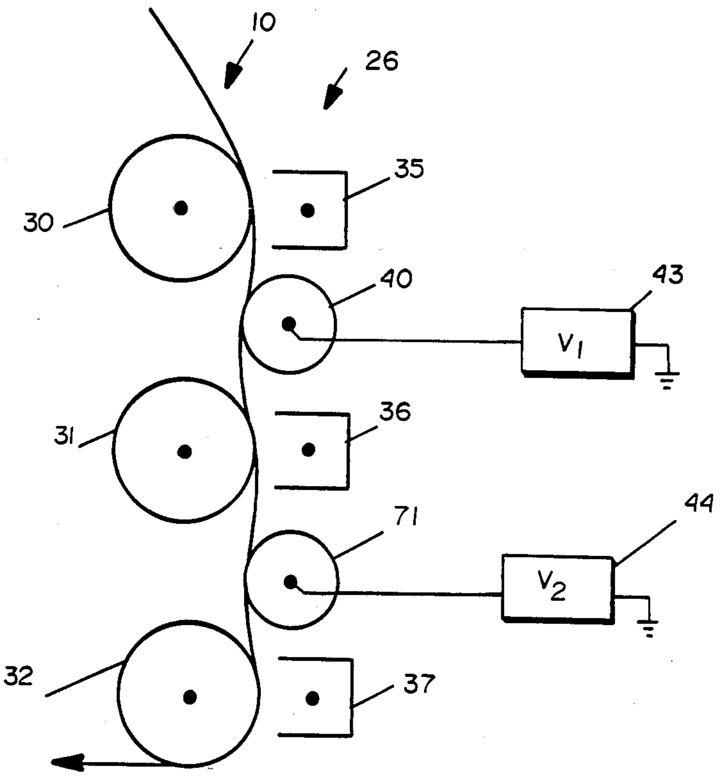
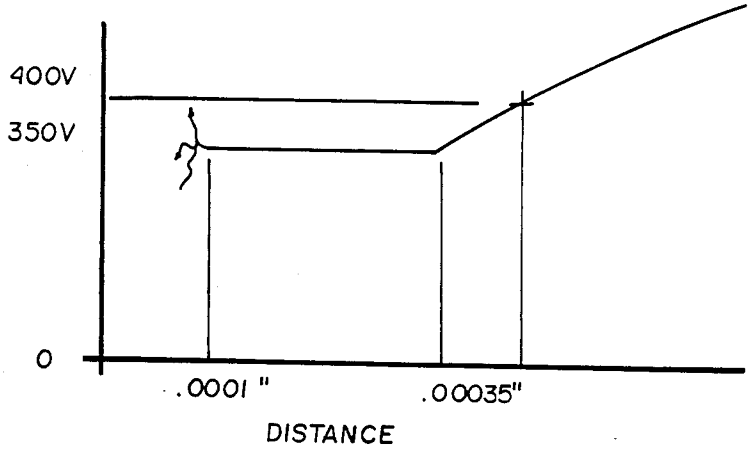
PASCHEN IONIZATION CURVE
FIG. 4

CONDITIONING APPARATUS FOR NON-IMPACT, DIRECT CHARGE ELECTROGRAPHIC PRINTER BELT

FIELD OF THE INVENTION

This invention generally relates to direct charge deposition electrographic printing apparatus using a dielectric belt and is more particularly directed to apparatus for elecrostatically conditioning the charge receiving surface of such a belt.

BACKGROUND OF THE INVENTION

Non-impact electrographic printers generally use a dielectric surface to receive an electrostatic charge to form a latent image of the information that is desired to be printed; that latent image is, in accordance with known techniques, developed with a suitable toner and transferred to paper on which the image is thereafter fixed, as by heat. The electrostatic surface on which the latent image is formed is most often a moving dielectric, with an appropriate conductive ground plane, on which electrostatic information is provided, by a print head, and such a general combination can be found in my prior U.S. Pat. No. 4,638,339 entitled ELECTROGRAPHIC CHARGE DEPOSITION APPARATUS and assigned to the assignee of the present invention. Before the latent image can be effectively produced on the electrostatic surface, the image receiving dielectric surface must be cleaned of residual toner such as by the apparatus of co-pending application Ser. No. 07/131,753 entitled CLEANING SYSTEM FOR NON-IMPACT PRINTER, assigned to the same assignee of this invention.

Additionally, the electrostatic charge receiving surface of the dielectric belt should be conditioned by bringing that electrostatic surface voltage to the correct average level and with sufficient uniformity to be properly compatable with the image generation of the print head and the subsequent development process utilizing the toner. Direct charge deposition printers generally have low background to signal voltage relationships because of the nature of the charge deposition process; hence, corona flooding techniques of the prior art cannot be effectively utilized to prepare the dielectric surface of the printer belt of the present invention using direct charge deposition.

OBJECTS OF THE INVENTION

It is a principal object of this invention to provide apparatus for uniformly and accurately conditioning the electrostatic charge receiving surface in a direct charge deposition electrographic printing apparatus using a flexible dielectric belt.

It is a further object of this invention to provide apparatus which enhances the formation of a high quality latent image by a direct charge deposition print head on a dielectric belt.

It is an additional object of this invention to provide simplified apparatus including at least one conductive roller, that is economically constructed to condition the electrostatic charge receiving surface of electrographic printing apparatus.

It is a still further object of this invention to provide low cost economical treatment of the dielectric surface of a moving belt electrographic printer using direct charge deposition for imaging.

Other objects will be in part obvious and in part pointed out in more detail hereinafter.

A better understanding of the objects, advantages, features, properties and relations of the invention will be obtained from the following detailed description and accompanying drawings which set forth certain illustrative embodiments and are indicative of the ways in which the principles of the invention are employed.

SUMMARY OF THE INVENTION

The present invention provides a plurality of electrically conductive rollers supported in engagement with the dielectric surface of a flexible belt used in non-impact electrographic printing apparatus, which rollers because of their electrically conductive nature and the voltages applied thereto enable the electrostatic receiving surface to achieve improved surface electrostatic voltage conditioning before the print head forms a latent electrostatic image with direct charge deposition. The invention also includes the utilization of corona devices in combination with the plurality of conductive rollers to achieve the desired belt conditioning.

BRIEF DESCRIPTION OF THE DRAWINGS

FIG. 2 is a schematic drawing of a preferred embodiment of the belt conditioning apparatus;

FIG. 4 is a graphic illustration of a Paschen ionization curve;

DETAILED DESCRIPTION OF THE INVENTION

Figure 1:
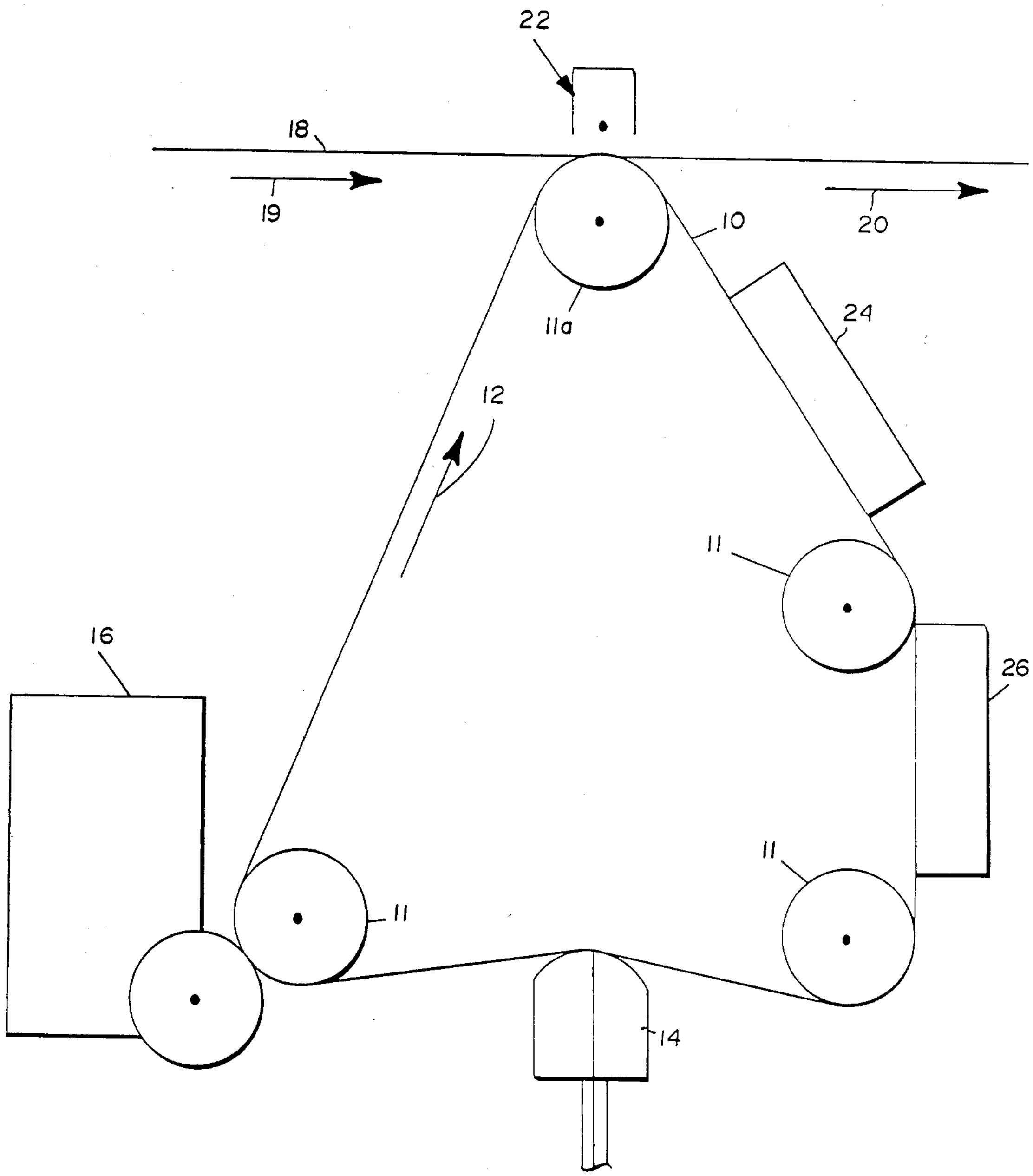
FIG. 1 schematically illustrates an electrographic printer including the belt conditioning apparatus of the present invention.

Turning first to FIG. 1 and the schematic illustration of non-impact printer including the present invention, a suitable dielectric image belt 10 such as that shown in co-pending application Ser. No. 07,131,828 entitled BELT AND BELT SUPPORT DRIVE FOR NON-IMPACT, DIRECT CHARGE ELECTROGRAPHIC PRINTER and assigned to the assignee of the present invention, is supported on a plurality of rollers 11, one or more of which may be driven to produce movement of the belt 10 in the direction of arrow 12. The print head 14 of the preferred embodiment of this apparatus is preferably of the type disclosed in U.S. Pat. No. 4,638,339 issued Jan. 20, 1987 and assigned to the assignee of the present invention, which print head serves to create on dielectric belt 10 a latent electrostatic image in accordance with the voltages applied to the pins of print head 14.

In accordance with conventional techniques, a suitable toner is supplied to belt 10 by developer apparatus generally designated 16, which toner is attracted in accordance with the electrostatic charge on belt 10. A continuous sheet of paper 18 is suitably driven in the direction of arrows 19 and 20 so as to pass roller 11*a*, which roller is directly opposite and supportive of belt 10 at transfer corona 22. After the image has been transferred to paper 18, the belt continues to cleaning station 24. Following such cleaning, dielectric belt 10 continues through conditioning station 26, the subject of this invention, to prepare dielectric belt 10 to receive the image from print head 14. In accordance with conventional techniques, the paper with the image transferred thereto by the transfer corona 22, continues to a suitable image fixing or fusing station (not shown) which apparatus can be constructed in accordance with U.S. Pat. No. 4,642,661 entitled PRINTER WITH DRIVE ON SWINGING PLATFORM and assigned to the assignee of the present invention.

By way of explanation, applicants use the term "corona" in a generic sense to refer to a fairly wide variety of commercially available corona discharge devices as well as devices which generate or produce ions which are characteristic of a corona. The specific details of the corona generation of production of ions is not an essential part of the invention and hence applicants use the generally accepted term "corona" in connection therewith.

Turning next to FIG. 2 which sets forth a schematic cross section of the belt conditioning apparatus of FIG. 1 from which the housing and support structure has been omitted for reasons of clarity of explanation, applicants have illustrated a preferred form of the invention which can be generally described to as a "two roller, three corona" conditioning station. More specifically, belt 10 is a flexible dielectric belt having a ground plane layer and general construction of the type shown in my U.S. Pat. No. 4,638,339 and in aforementioned co-pending application Ser. No. 07/131,828 entitled BELT AND BELT SUPPORT DRIVE FOR NON-IMPACT, DIRECT CHARGE ELECTROGRAPHIC PRINTER, has exited belt cleaning station 24 following removal of toner particles remaining thereon and proceeds to be electrically prepared and conditioned for the direct charge deposition printing as at 14.

There is provided (with appropriate support and housing structure not shown) a series of three independently supported rollers 30, 31 and 32 which establish spacing of belt 10 opposite the coronas (corona discharge devices) 35, 36 and 37, each of the corona devices being supported and electrically energized in any suitable conventional manner to produce the function herein described. Rollers 40 and 41 are made of electrically conducting material and supported in between the coronas 35, 36 and 37 to engage the dielectric surface of belt 10; preferably, each conductive roller 40 and 41 engages belt 10 in a free-span portion (or unsupported portion) to allow uniform contact with the dielectric surface of belt 10. Depending upon the specific conditions to be achieved, the conductive rollers 40 and 41 may actually serve to slightly deflect the belt 10 in the region of contact thereby to bring about uniform area contact with the belt rather than merely line contact. Conductive roller 40 is connected to power supply 43 labeled V1 and conductive roller 41 is electrically connected to power supply 44 labeled V2. It is also to be understood that appropriate electrical circuitry is provided for the energization and control of each of the corona devices 35, 36 and 37 but such associated circuitry is conventional has been omitted for purposes of clarity. As is quickly seen from the arrangements of elements of FIG. 2, belt 10 enters the conditioning station from the cleaning station, passing over support roller 30 while its surface is exposed to the electrical charges produced from corona 35. Belt 10 then passes under conductive roller 40, over support roller 31 wherein it is subjected to corona 36 and thereafter under conductive roller 41, finally exiting and conditioning station after treatment under corona 37.

Figure 3A:
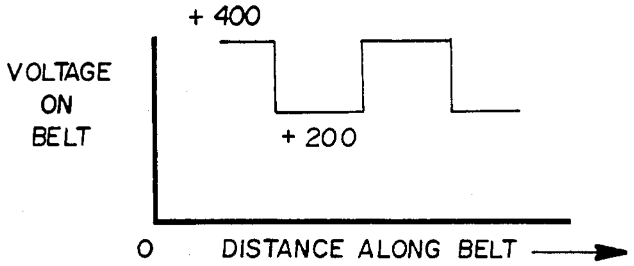
FIGS. 3*a* through 3*f* are graphic illustrations of voltages at various points of the apparatus of FIG. 2
Figure 3B:
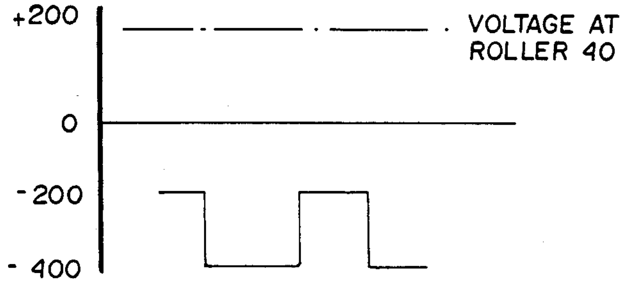
Figure 3C:
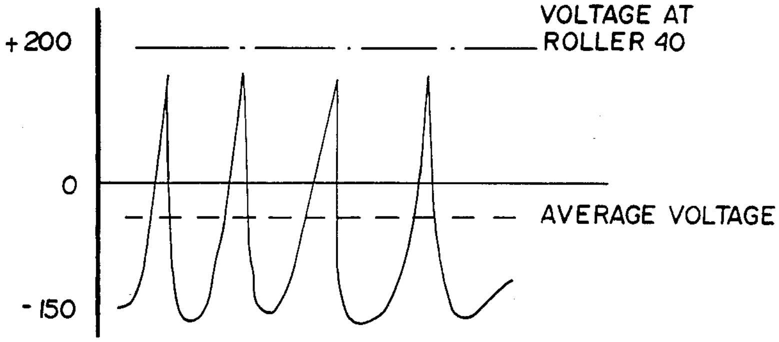

Considering FIGS. 3*a* through 3*f* in conjunction with FIG. 2, applicants describe in graphic form the range of voltages that might well be expected in conditioning station 26. It must be remembered however that these voltages are not intended to be a precise indication resulting from test information but rather representative of values which permit comparison of the actions taking place in the conditioning station. Moreover, polarity at each roller station need not be specifically "plus" or "minus" but rather need only be such as to produce Paschen discharge following the curve of FIG. 4. In FIG. 3*a*, the electrostatic belt voltage expected to be found after developing, transfer and cleaning having taken place show that the areas of image wherein information was provided by the print head can be considered to be at plus 400 volts with the background areas or non-print areas being at approximately plus 200 volts. FIG. 3*b* shows the voltage relationships existing in the region of corona 35 and roller 30 wherein the belt surface has been subjected to corona 35 (which is defined as a "flood corona" because it floods the surface with the desired charge) to bring the voltage on the image surface of the belt to a potential where all areas are at least 350 volts away from the potential on roller 40. FIG. 3*b* also shows the belt voltage shifted negative by 600 volts as a result of the action of the flood corona. In FIG. 3*c*, the first roller is maintained by its power supply 43 at a voltage V1 which is held at plus 200 volts so that the negative 200 volt charge area of the belt shown in FIG. 3*b* is 400 volts away from the potential at roller 40.

As the belt proceeds to reach the area just prior to corona 36, it is seen that a spiked voltage pattern can be observed.

It is believed useful to understanding of the foregoing FIGS. 3*a* through 3*c* and the subsequent figures if attention is drawn to the fact that the transfer of electric charges across a gap is the subject of considerable work by Fredrich Paschen.

FIG. 4 shows what is called the Paschen ionization relationship between air gap at standard temperature and pressure and current flow threshold voltage. It has been found for a gap between a conductive surface and a dielectric image surface of 0.0001 inches of 0.00035 inches, current will not flow until a potential of 350 volts is present therebetween and that if the potential is greater that 350 volts, current will flow charging the surface until a 350 volts difference is present at which point current flow will automatically stop. If voltages greater than 400 volts exist, the current flow is likely to become so vigorous that the air in the gap between the conductor and the dielectric surface becomes ionized and more conductive than free air such that the dielectric surface charges to a potential closer to that of the conductor than that of the Paschen threshold voltage of 350 volts which is determined to exist before current flow is extinguished.

Figure 5:
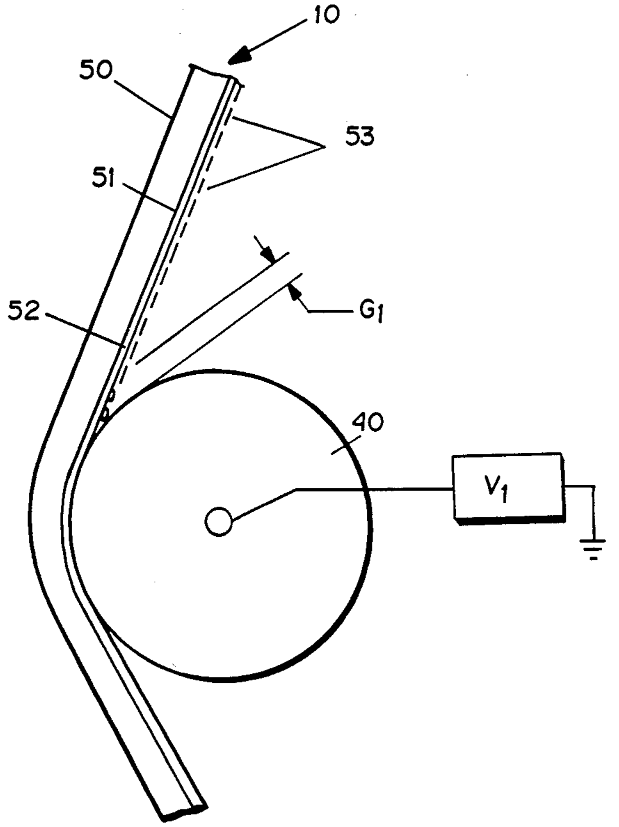
FIG. 5 is a schematic view of the electrostatic field at a conductive roller of the apparatus of FIG. 2.
Figure 6:
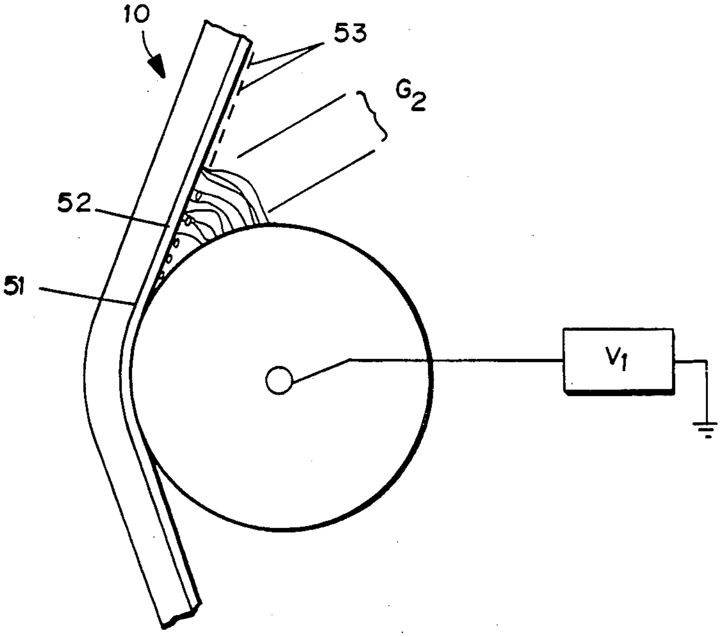
FIG. 6 is a schematic view of the electrostatic field upon further belt travel.

As seen in FIG. 5 which is an enlarged schematic presentation of the interface between roller 40 and belt 10, it is seen that belt 10 approaches conductor roller 40, the space between a high voltage point on the belt and the surface of the roller decreases until the critical gap G1 is present thereby permitting current flow. For completeness, it is noted that the numeral 50 indicates a mechanical support layer for the belt, 51 indicates a ground plane layer for belt 10, 52 indicates the dielectric surface of belt 10 and the numeral 53 is used to indicate a plurality of irregular surface charges. If the belt/roller gap voltage is greater than 400 volts, local ionization takes place creating in the air gap a cloud of ionized gas that will allow current flow at a gap greater than G1. The discharge zone thus progresses toward the incoming belt until the space between roller 40 and belt 10 has increased to a new gap G2 as best seen in FIG. 6, that gap being large enough to prevent current flow even with the presence of the ionized cloud created at the initial discharge at gap G1. Hence the resulting belt voltage is "patterned" because of the repeated start/extinguish voltage cycle. FIG. 3*c* represents an approximation of that pattern, a "spiked" pattern. Corona 36 can be considered to be a negative voltage reflood corona which is used to smooth the voltage pattern appearing in the region illustrated by FIG. 3*c* by the tendency of the ionized cloud created by the reflood corona to be more strongly attracted to those areas of the belt where the voltage is farthest removed from the corona voltage; i.e. the +150 V peaks rather than the −150 V troughs. Thus, there is produced a more uniform belt/roller voltage of approximately 350 to 400 volts as seen in FIG. 3*d* a graph of voltage taken just prior to roller 41.

Figure 3D:
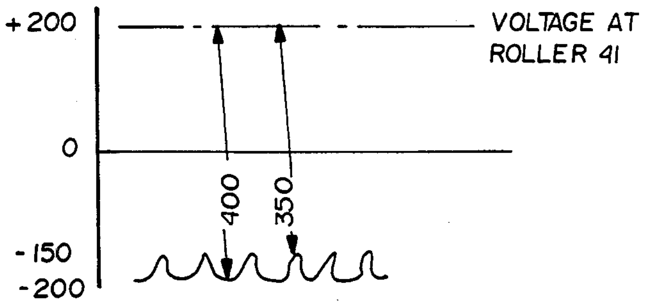

The conditioning that exists immediately following corona 36 as belt 10 progresses through the belt conditioning apparatus of this invention can be considered adequate for many printing purposes; however, the ripples shown in FIG. 3*d* are such that the variations in the background voltage will show-up in the final toned and transferred print as variations in print darkness a condition that may be unacceptable.

Figure 3E:
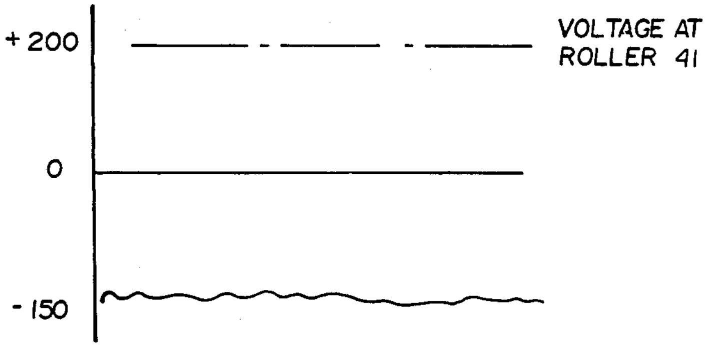

To eliminate the final ripple effect, a second conditioning roller 41 is provided, which conductive roller is energized through power supply V2 energized at approximately 200 volts as seen in FIG. 3*e*. Again by referring to FIG. 5, the aforementioned description of the discharge action that takes place with changing gap can be used but the potential difference that exists is not so great above the Paschen voltage as to permit excessive ionization of the air gap. Without such ionized cloud being formed, all points on the belt will discharge in the normal fashion until the 350 volt threshold Paschen voltage is reached resulting in the substantially uniform voltage emerging from the second conductive roll 41 as best seen in FIG. 3*e*.

Figure 3F:
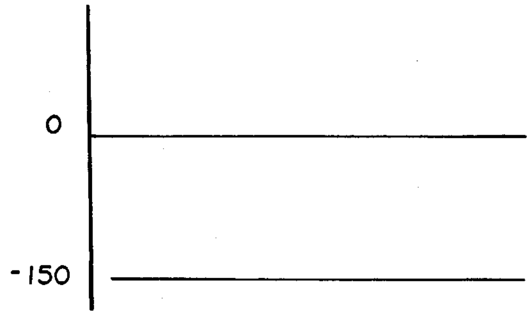

If desired, small non-uniformaties in the belt voltage which result from pressure contact discharge can be smoothed by the use of AC corona 37 which can be deemed to be a fill corona to produce a voltage pattern substantially shown in FIG. 3*f* when measured at roller 32.

The desired control of dielectric surface charge at discharge conductive rollers 43 and 44 will occur regardless of the means used to obtain the potential on the image surface. Hence it is possible to perform the desired conditioning with the use only of rollers 43 and 44 in the manner heretofore described by adjusting the voltage on any given roller to the desired value at 350 volts away from the voltage of the previous roller, the use of multiple rollers can be viewed as an alternative embodiment to the use of multiple rollers with multiple corona discharge devices.

It should also be noted that by varying the voltage on the rollers permits the voltage on the belt to be adjusted to any desired level.

As will be apparent to persons skilled in the art, various modifications, adaptations and variations of the foregoing specific disclosure can be made without departing from the teachings of this invention.

I claim:

1. In an electrographic printer, a flexible belt having a dielectric charge receiving surface and means for conditioning the dielectric surface prior to imposition of electrostatic information by a print head, said means for conditioning comprising electrically conductive means in direct contact with the charge receiving surface, said electrically conductive means being electrically energized to effect a substantially uniform surface potential.

2. The electrographic printer of claim 1 wherein said electrically conductive means comprises at least one conductive roller supported for rolling contact with said charge receiving surface.

3. The electrographic printer of claim 1 wherein said electrically conductive means comprises at least two spaced conductive rollers supported for rolling contact with the charge receiving surface, each of said rollers being electrically energized to a different voltage.

4. The electrographic printer of claim 2 wherein corona discharge devices are supported facing the charge receiving surface and on each side of the conductive roller.

5. The electrographic printer of claim 3 wherein at least three corona discharge devices are supported facing the charge receiving surface in alternating arrangement with said conductive rollers.

6. The electrostatic printer of claim 3 wherein each said roller engages said charge receiving surface at a location wherein said belt is in free span support.

7. The electrostatic printer of claim 5 wherein each said roller engages said charge receiving surface at a location wherein said belt is in free span support and wherein each corona discharge device is positioned opposite a support roller for said belt.

8. The electrostatic printer of claim 3 wherein each roller is energized at the approximate Paschen voltage relative to the voltage on the dielectric surface.

9. In an electrographic printer having an endless flexible moving belt having a dielectric surface and a conductive ground plane in juxtaposition thereto and co-extensive therewith for accepting electrostatic image information, a belt conditioning apparatus for effecting desired charge level on the belt before the belt accepts image information from a direct charge deposition print head, said belt conditioning apparatus comprising:

a plurality of electrically conductive conditioning rollers spaced along the path of travel of said belt and connected to a voltage source; and said belt being supported for engagement with at least a portion of the surface of each of said rollers.

10. The apparatus of claim 9 wherein a corona discharge device is supported for bathing the surface of said belt with electrostatic voltages prior to engagement with each of said conductive rollers.

11. The apparatus of claim 9 wherein said belt is in free span support where engaged by the conductive roller.

12. The apparatus of claim 10 wherein at least three corona discharge devices are supported facing the charge receiving surface in alternating arrangement with said conductive rollers.

* * * * *